Patented Sept. 22, 1931

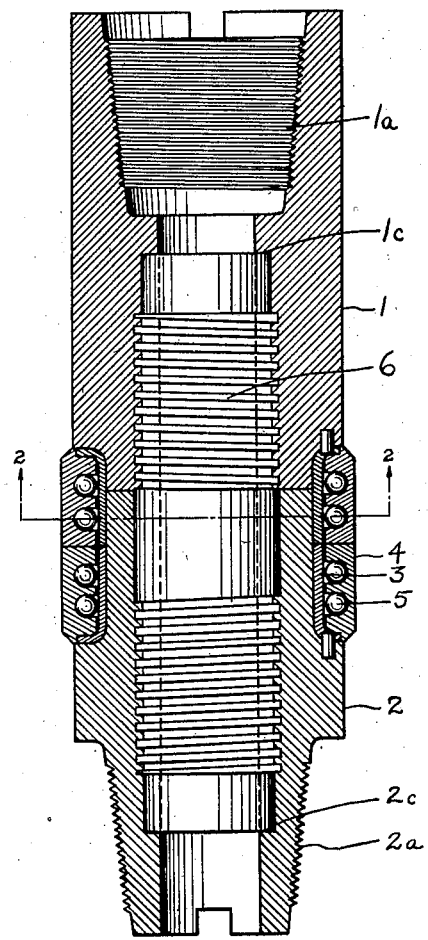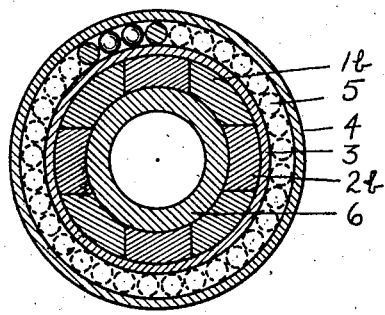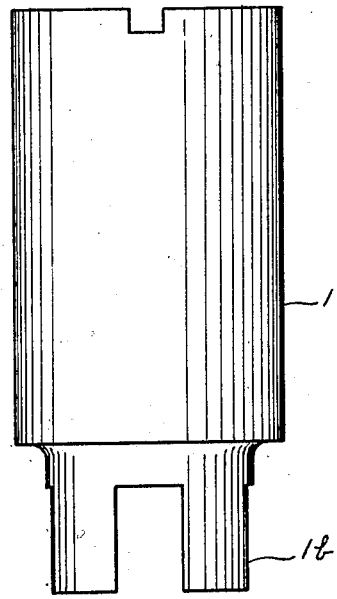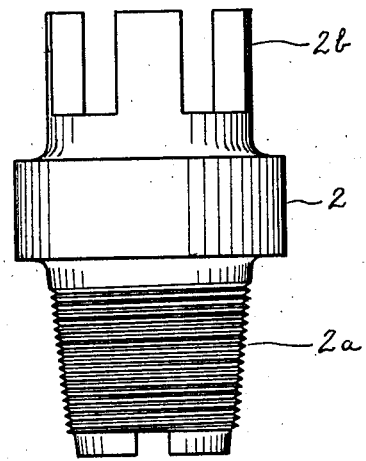

1,824,257

UNITED STATES PATENT OFFICE

CLINTON H. M. BULL, OF HOUSTON, TEXAS, ASSIGNOR TO REED ROLLER BIT COMPANY, OF HOUSTON, TEXAS, A CORPORATION OF TEXAS

TOOL JOINT

Application filed January 30, 1928. Serial No. 250,349.

This invention relates to tool joints and has for its general object to provide a new and improved tool joint particularly adapted for hollow drill stems and the like.

Drill stems used in deep well drilling usually embody a number of pipe sections joined together by tool joint couplings, and lateral movement thereof, caused by bent portions, loose joints, etc., results in serious wear. One of the objects of this invention is the provision of a tool joint having antifriction means to prevent wear of a drill stem.

Another object is to provide a tool joint having new and improved means to lock the parts thereof together.

Other objects will hereinafter appear.

In the accompanying drawings, which are illustrative of the preferred embodiment of the invention, Fig. 1 is a side elevation partly in section of the assembled tool joint; Fig. 2, a horizontal section on the line 2—2 of Fig. 1; Fig. 3, a side elevation of the upper section of the tool joint; and Fig. 4, a side elevation of the lower section of the tool joint.

Referring more specifically to the drawings, the upper section of the tool joint is indicated at 1, and the lower section, at 2. The upper section may be provided with internal screw threads 1—a, and the lower section with external screw threads 2—a. The threads 1—a and 2—a are adapted to engage the threads of adjacent pipe sections, not shown.

The sections 1 and 2 are provided, respectively, with interlocking fingers 1—b and 2—b.

The sections 1 and 2 are reduced to form, when united, an annular groove for the reception of antifriction means comprising bushing 3, sleeve 4, and balls 5 therebetween. The bushing 3 and sleeve 4 may be made in as many separable parts as may be desired.

An internal turn buckle 6, threaded into said sections as shown, serves to draw and lock the same together. The turn buckle 6 is hollow, and may be rotated by a suitable tool inserted therein and made to engage the inner surface thereof. The sections are recessed for the reception of the turn buckle, and the internal annular shoulders 1—c and 2—c serve to support the adjacent ends of turn buckle 6.

The many advantages of this invention will be apparent to those skilled in the art.

The invention is not limited to the specific embodiment shown, and various changes may be made without departure from the scope of the following claims.

I claim:

1. A tool joint having a pair of sections, said sections having reduced ends, interlocking fingers on said reduced ends, means to connect said sections together, and antifriction means surrounding said fingers.

2. A tool joint having a pair of sections, the adjacent ends of said sections being reduced and having interlocking fingers, a bushing surrounding said fingers, a means to connect said sections together, a sleeve surrounding said bushing, and balls between said bushings and sleeve.

3. A tool joint for hollow drill stems and the like, said joint comprising a pair of hollow sections having means to prevent relative rotation thereof, and a hollow turn buckle within and connecting said sections together.

4. A tool joint for hollow drill stems and the like, said joint comprising a pair of hollow sections having interlocking fingers, and a hollow turn buckle within and connecting said sections together.

5. A tool joint for hollow drill stems and the like, said joint comprising a pair of hollow sections and means to prevent relative rotation thereof, and a hollow turn buckle within and connecting said sections together, said sections being recessed for the reception of said turn buckle.

6. A tool joint for hollow drill stems and the like, said joint comprising a pair of hollow sections having means to prevent relative rotation thereof, and a hollow turn buckle within and connecting said sections together, said sections having internal shoulders against which the ends of the said turn buckle abut.

In testimony whereof, I hereunto affix my signature.

CLINTON H. M. BULL.